United States Patent [19]

Dugua

[11] Patent Number: 4,476,101

[45] Date of Patent: Oct. 9, 1984

[54] PRODUCING AMMONIUM URANATE IN SPHERICAL PARTICULATE FORM

[75] Inventor: Jacques Dugua, Charly Par Vernaison, France

[73] Assignee: Produits Chimiques Ugine Kuhlmann, Paris, France

[21] Appl. No.: 299,021

[22] Filed: Sep. 3, 1981

[30] Foreign Application Priority Data

May 22, 1979 [FR] France ............................... 79 12953

[51] Int. Cl.³ .............................................. C01G 43/00
[52] U.S. Cl. ...................................... 423/253; 423/15; 264/0.5
[58] Field of Search .................... 423/253, 15; 264/0.5

[56] References Cited

U.S. PATENT DOCUMENTS

| | | | |
|---|---|---|---|
| 3,000,698 | 9/1961 | Crowe | 423/253 |
| 3,228,749 | 1/1966 | Akimoto et al. | 264/0.5 |
| 3,394,997 | 7/1968 | de Hollander | 423/253 |
| 3,472,922 | 10/1969 | Kuohk et al. | 264/0.5 |
| 3,758,664 | 9/1973 | Gerrald | 423/15 |
| 3,998,925 | 12/1976 | Fuller | 423/253 |
| 4,035,468 | 7/1977 | Craigen | 423/253 |
| 4,065,529 | 12/1977 | Laverta et al. | 149/92 |
| 4,234,550 | 11/1980 | de Hollander | 423/15 |
| 4,352,857 | 10/1982 | Dugua | 423/253 |

FOREIGN PATENT DOCUMENTS

| | | | |
|---|---|---|---|
| 806092 | 2/1969 | Canada | 423/253 |
| 14296 | 8/1980 | European Pat. Off. | 423/253 |
| 844407 | 8/1960 | United Kingdom | 423/253 |

*Primary Examiner*—Edward A. Miller
*Attorney, Agent, or Firm*—Brooks Haidt Haffner & Delahunty

[57] ABSTRACT

A novel easily handled substantially particulate ammonium uranate with a mean diameter between 30 and 150 micrometers, an apparent untamped bulk density of 2 to 2.8 g/cm³, and a flowability measured on the Carr scale equal to or greater than 95, with a low sulfate ion content between 0.5 and 1%, together with a fluidized bed process for preparing such ammonium uranate by precipitation of a super-saturated solution of ammonium uranate obtained by reacting an uranium sulfate solution and an ammoniacal solution, operating at a pH of about 6.6 to 7.2.

6 Claims, 3 Drawing Figures

50 μm

100 μm

PRODUCING AMMONIUM URANATE IN SPHERICAL PARTICULATE FORM

BACKGROUND OF THE INVENTION

The present invention relates to a novel improved ammonium uranate and processes for its preparation, and more particularly, this invention provides an ammonium uranate in the form of substantially spherical particles with a well-controlled particle size, an increased apparent density and very good flowability, together with a process for obtaining such an ammonium uranate by crystallization and agglomeration of uraniferous feed solutions.

Ammonium uranate is the uraniferous concentrate customarily used in plants for the conversion of uraniferous concentrates to the fluorides or oxides of uranium required in the fabrication of nuclear fuel elements. According to the actual extraction technique described, for example, by R. Merrit, The Extraction Metallurgy of Uranium, Library of Congress Catalog, at pages 240–246, the uranium contained in uraniferous minerals is recovered after dissolution of the mineral, purification, and concentration of the uraniferous solution, in the form of acid or alkaline liquors. The uraniferous concentrates are obtained by precipitation starting with acidic or basic solutions in a medium of sulfate $SO_4^{--}$, and/or carbonate, $CO_3^{--}$, ions and particularly with ammonia.

The precipitation is carried out in a series of vessels with agitation and a temperature of 60°–70° C. The pH is adjusted between 7 and 8 to a value which increases slowly from one vessel to another. From this process there results a very fine ammonium uranate precipitate (the finer as the pH is raised) having a thixotropic character which is difficult to filter and dry.

These particles have an irregular form, and the product obtained possesses poor flowability. The handling of such a product causes health and safety problems due to the discharge of dusts rich in uranium, as in plants for the preparation of uranium-bearing concentrates, during drying and loading of the solid into casks, and as in refineries which recover these uranium-bearing concentrates for purification and conversion to oxide, fluoride and metal.

The ammonium uranate should moreover have a sulfate ion, $SO_4^{--}$, content below 3% (Allied Co standard) but the tendency is toward a lower limit of 2%. These $SO_4^{--}$ ions arise from the formation of basic uranyl sulfate according to the equation:

(1) 

which in the presence of an excess of $NH_4OH$ leads to ammonium uranate according to the equation:

(2) 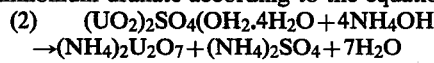

following the Merrit reference cited above.

The requirement to obtain a low content of $SO_4$ ions leads to carrying out the precipitation of the ammonium uranate at a more alkaline pH, thereby causing a more abundant nucleation resulting in a pulverulent product which is dangerous to handle.

These is accordingly a commercial need to handle ammonium uranate in a manner which will give greater handling safety, that is, with a greatly reduced discharge of uraniumrich powders, and at the same time providing good purity, particularly with respect to $SO_4$ ions.

THE INVENTION

The present invention responds to these needs and provides a process which permits the production of a less dusty ammonium uranate with greater purity, utilizing a fluidized bed as described in French Patent 1,187,352. Briefly, the process for providing the novel ammonium uranate comprises forming polycrystalline agglomerates by precipitation of a supersaturated solution in the presence of a solid support comprised of fluidized particles derived from nucleation and growth of the solute. The particles formed grow and coalesce either among themselves or with already existing agglomerates. These fine particles and agglomerates are kept in suspension with the help of a selected flow of supersaturated feed and/or recycled solution. The supersaturation state is maintained substantially constant by the continual input of material to be crystallized. The process provides relatively uniform spherical ammonium uranate particles with good flowability, purity, and bulk density.

The invention is further described by reference to the accompanying drawings wherein.

To obtain the ammonium uranate in a fluidized bed according to the present invention, the supersaturated solution is prepared by reaction of uranyl sulfate and an ammoniacal solution.

It has been found that working in a fluidized bed having a pH from about 6.6 to 7.2, and preferably a pH of between 6.8 and 7.1, a product is obtained which does not give off fines during handling and contains only about 0.5 to 1% sulfate ions.

This is very surprising when it is considered that to avoid the sudden appearance of basic uranyl sulfate or to direct Equation 2 towards the precipitation of ammonium uranate, it is necessary to operate at a high pH.

The concentration of the ammoniacal solution utilized for neutralization of the starting uraniferous solution is from about 5 to about 200 g/L of ammonia. The neutralization of the uranium-bearing solution in the fluidized bed by ammonia is a rapid and complete reaction. The exhaustion of uranium from the solution leaving the crystallizer vessel is thus very good. It is further desirable that the introduction of the uranium-bearing solution and the ammoniacal solution be carried out carefully in order to maintain the efficiency of the fluidized bed throughout its height.

A controlled input of the fine ammonium uranate particles in the fluidized bed is required to maintain production of ammonium uranate having a constancy of particle size over a period of time. According to the usual crystallization technique in fluidized beds, one such input of fines is carried out by the introduction in the fluidized bed of fines prepared by an auxiliary process, such as grinding the large particles, which raises the cost of the process.

It has been found according to the present invention that is is possible in the case of ammonium uranate to avoid the necessity for such an outside supply of fines by controlling the pH as a function of time. One preferred mode of carrying out the invention comprises serially increasing the value of the pH into a range comprising about 7.2 to 7.8, and in certain preferred embodiments from 7.1 to 7.4, during a selected time interval, for example, during from about 10 minutes to about four hours at a weekly frequency of about one to 14 times, either in a limited zone of the reactor or in its total volume. The apparatus can also function by itself without calling on an outside source for the production of fine particles, although this can also be done.

The invention permits the treatment of uranyl sulfate solutions containing from 0.05 to 40 g/L of uranium. This is a particular advantage because one can treat either acid or alkaline solutions, obtained after solvent purification or ion exchange resin purification of the solution, resulting from dissolution of uranium-bearing minerals and the extraction of uranium from uranium-bearing effluents.

Figure 1:
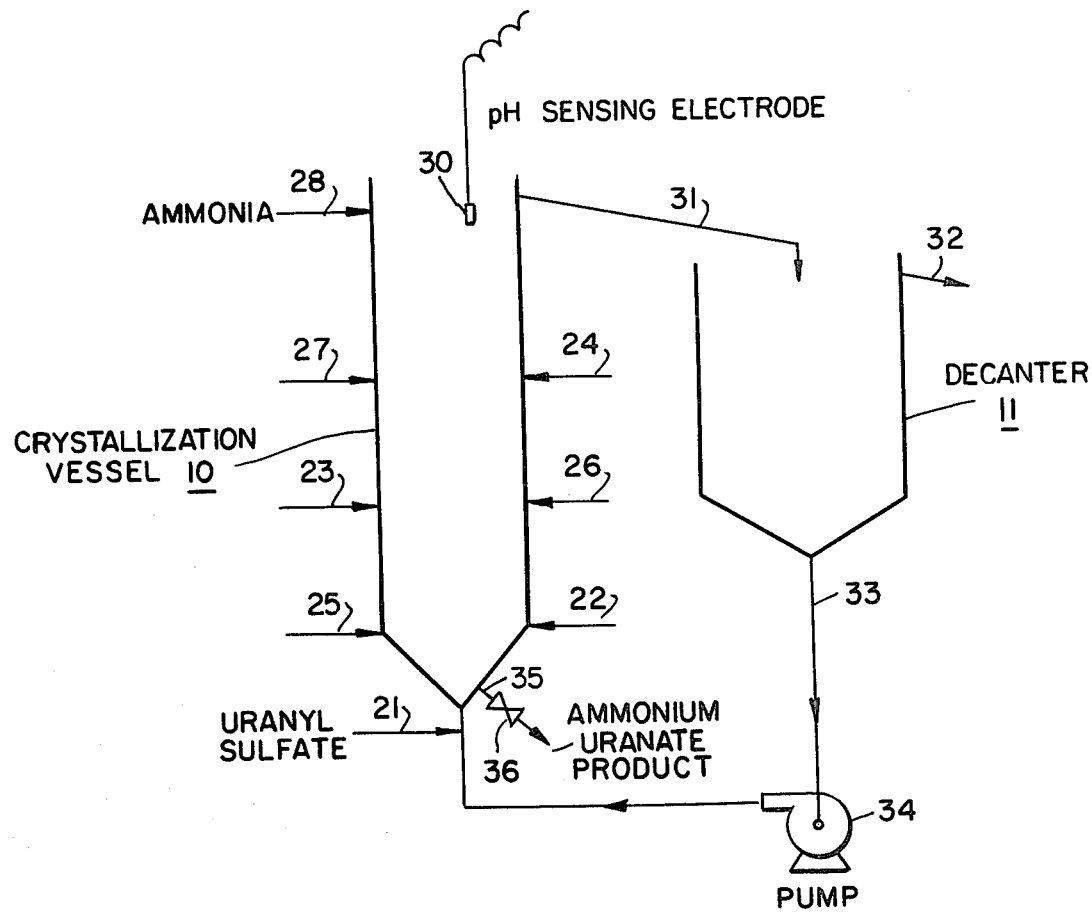
FIG. 1 is a flow diagram of one embodiment of the process of this invention.

The invention will further be described with reference to FIG. 1 showing crystallization vessel 10 and decanter 11. Uranyl sulfate is introduced into recycle line 36 through injector 21 and the combined stream passes upwardly into the conical section at the bottom of vessel 10 to provide for fluidization of the particles.

Additional uranyl sulfate solution is uniformly introduced through conduits 22, 23 and 24. At the same time, aqueous ammonia solution is introduced into vessel 10 through conduits 25, 26 and 27, the lines for the introduction of the uranyl sulfate and the ammonia solution being distributed along the height of vessel 10.

Control of the pH is maintained by introducing ammonia through line 28 into the top of the fluidizer, the quantity of ammonia being regulated by a pH controller (not shown) which senses the pH through electrode 30.

Some of the liquid in vessel 10 is removed therefrom through line 31 and conveyed to decanter 11. A portion of this liquid is removed from decanter 11 through line 32, while the remainder is recycled through line 33 to pump 34 and back through line 36.

From time to time ammonium diuranate particles are removed through line 35 controlled by valve 36.

Figure 3:
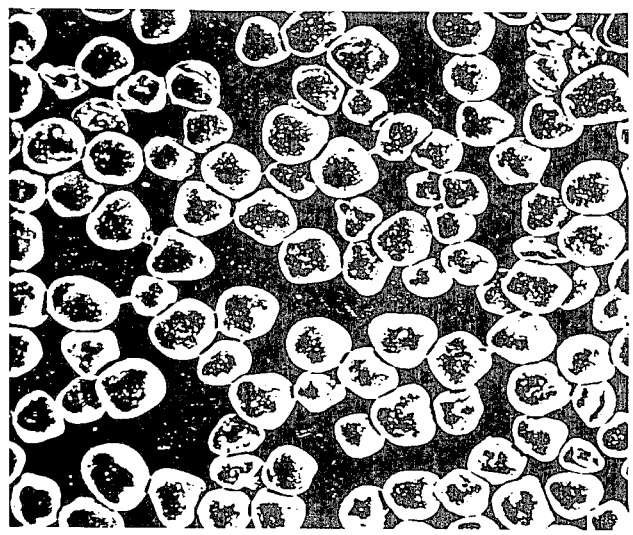
FIG. 3 shows the ammonium uranate particles provided according to the present invention.

The ammonium uranate obtained according to the present invention is provided in the form of smooth spherical agglomerates, such as are shown in FIG. 3. The mean diameter of these agglomerates is from about 30 to 150 μm, and in certain preferred embodiments, it is from about 40 to about 100 μm. These agglomerates have a great flowability and their apparent untamped bulk density measured according to standard NF A 95-111 of February 1977 is from 2 to 2.8 g/cm³. When the products of the present invention are handled, there is no dusting of very light fine particles which cause atmospheric pollution in the area and harm to the users.

The flowability according to the test method described by R. L. Carr at page 163 in the Jan. 18, 1965 number of "Chemical Engineering" has a value equal to or greater than 95 for the ammonium uranate obtained according to the present invention, by contrast to the ammonium uranate precipitated according to the prior art method, utilizing a series of cascaded tanks, which product has a flowability on the order of 30 to 35. It has been further found that the present invention provides ammonium uranate having only a small amount of sulfate ions, $SO_4^{--}$, from about 0.5 to 1%.

The following Examples are given to illustrate embodiments of the invention as it is presently preferred to practice it. It will be understood that these Examples are illustrative, and the invention is not to be considered as restricted thereto except as indicated in the appended Claims

EXAMPLE I

Comparison

A one-liter Pyrex beaker holding 750 ml of mother liquor containing 72.7 g/L of $SO_4^{--}$ and 28.3 g/L of $NH_4^+$ ions is charged with 100 g of ammonium uranate from a preceding process. The ammonium uranate particle sizes are from about 5 to about 10 μm.

The suspension so obtained is kept at 70° C. and vigorously agitated with a stirrer rotating at 300 rpm. There is then continuously added through a dip tube a flow of 0.5 L/hr of a uranyl sulfate containing 20 g/L of uranium. The pH is kept constant at from 7.2 to 7.3 by introducing an aqueous ammonia solution containing 100 g/L of $NH_3$.

The ammonium diuranate formed is permitted to overflow into a second one-liter crystallizer similarly provided with a stirrer which runs at 200 rpm. The temperature in this beaker is kept at 70° C., and the pH at 7.5 to 7.6 by $NH_4OH$ addition.

Figure 2:
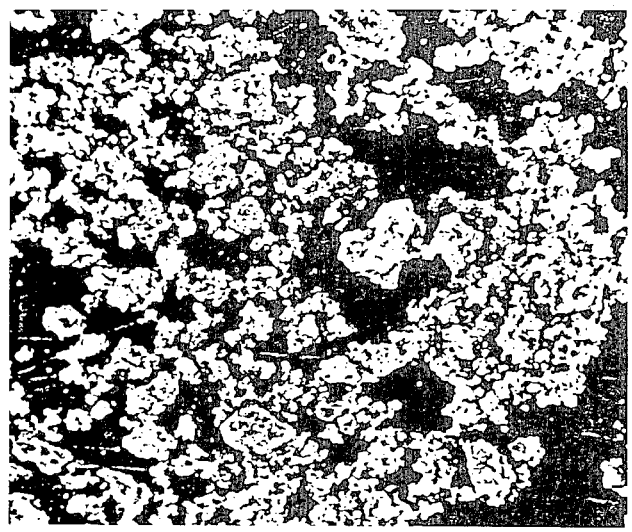
FIG. 2 shows ammonium uranate obtained according to a prior art method.

FIG. 2 is made from a photograph of the ammonium diuranate continuously withdrawn from the second crystallizer (after filtration, washing and drying). Its physical characteristics are as follows:

| | |
|---|---|
| Particle size | 1-20 μm |
| Apparent untamped bulk density | 1.08 g/cm³ |
| Carr test flowability | 35 |
| Quantity of $SO_4^{--}$ ions | 1.5% |

The product so obtained, which corresponds to that actually produced industrially, shows a very fine particle size, low bulk density, and poor flowability which makes its handling difficult and dangerous. Moreover, the $SO_4^{--}$ ion content, as is typical of the usual level, is rather high.

EXAMPLE II

The same ammonium diuranate mother liquor of crystallization as used in Example I is circulated in a closed circuit from the bottom to the top of vessel 10, a cylindroconical column with a diameter of 0.08 meters and a height of 0.6 meters. The temperature is 70° C. with a feed rate of 20 L/hr, so that the bed of ammonium diuranate particles is fluidized. Through injector 21 is introduced 0.5 L/hr of an uranyl sulfate solution containing 20 g/L of uranium, as well as 1 L/hr of this same solution through conduits 22, 23 and 24 distributed in a uniform manner in vessel 10.

An ammoniacal solution containing 100 g/L of ammonia is uniformly introduced through pipes 25, 26 and 27 so as to substantially maintain the precipitation stoichiometry. The pH is adjusted to a value of 6.9 to 7 by the introduction of ammonia through conduit 28, this being controlled by a Phit Num Tacussel type pH regulator, fitted with an Ingold type 10405 high alkalinity electrode 30. The mother liquor leaving crystallizer 10 passes through conduit 31 to decanter 11. One part of the stream is removed through conduit 32 and the remainder is recycled through conduit 33 by pump 34.

The precipitated ammonium diuranate is discontinuously removed at regular intervals through conduit 35 controlled by valve 36. The characteristics after 50 hours of operation are set forth as follows:

| | |
|---|---|
| Mean particle size | 70–80 μm |
| Apparent untamped bulk density | 2.5 g/cm³ |
| Carr test flowability | 97 |
| Quantity of SO₄ ions | 0.8% |

It is, however, difficult to keep the fluidized bed functioning well during a long period. The particle size of the particles withdrawn through line 35 increases regularly in the same manner as the homogeneity of the particle size in the bed, and this can produce an abundant and uncontrolled formation of very fine particles leading to a breakdown of the fluidized bed.

EXAMPLE III

This Example is carried out as in Example II, but the pH is raised from the range of 6.9–7 to the range of 7.2–7.3 during a one-hour period every 24 hours. The particle size of the particles withdrawn through line 35 is constant over a period of time and is:

| Particle Diameter | Amount (%) |
|---|---|
| Greater than 105 μm | 0.1 |
| From 105 to 75 μm | 32 |
| From 75 to 53 μm | 62.1 |
| From 53 to 37 μm | 5.6 |
| Smaller than 37 μm | 0.2 |
| Apparent untamped bulk density | 2.45 g/cm³ |
| Carr test flowability | 96 |
| Sulfate ion content | 0.7% |

The particles obtained are smooth and spherical. The absence of small particles in these products, their high bulk density, and their good flowability provide for easy and safe handling. Moreover, the purity of the ammonium diuranate obtained is excellent, the quantity of sulfate ion being very small.

All parts, percentages, proportions and ratios herein are by weight unless otherwise indicated.

What is claimed is:

1. A process for the production of an easily handled ammonium diuranate in the form of spherical particles having a mean diameter in the range of from 30 to 150 μm, an untamped bulk density of 2 to 2.8 g/cm³, and a Carr scale flowability of at least 95, said process comprising introducing a uranyl sulfate solution and introducing an ammoniacal solution into a fluidized bed of ammonium diuranate particles to produce a supersaturated solution of ammonium diuranate, precipitating the supersaturated solution in the fluidized bed at a pH in the range of from 6.6 to 7.2 to form the easily handled spherical particles of ammonium diuranate, and withdrawing the spherical particles so formed from the bed.

2. A process according to claim 1 wherein the uranyl sulfate solution contains from 0.05 to 40 g/L of uranium and the ammoniacal solution has a concentration of from about 5 to about 200 g/L of ammonia.

3. A process according to claim 1 wherein the pH is maintained in the range of from about 6.8 to 7.1.

4. A process according to claim 1 wherein fluidization of the bed is maintained by the introduction to the bottom of the bed of a stream comprising uranyl sulfate.

5. A process according to claim 4 wherein solution is withdrawn from the fluidized bed and the uranyl sulfate solution is introduced into the fluidized bed with the solution withdrawn.

6. A process according to claim 1 wherein fine particles of ammonium diuranate are periodically produced in the fluidized bed by raising the pH of the supersaturated solution from the range of 6.6 to 7.2 to the range of 7.2 to 7.8 for a time of from ten minutes to four hours with a weekly frequency of from one to 14 times.

* * * * *